June 8, 1965 F. W. SEYBOLD 3,187,600
MECHANICAL MOVEMENTS
Filed Nov. 14, 1961 7 Sheets-Sheet 1

INVENTOR.
Frederick W. Seybold

June 8, 1965     F. W. SEYBOLD     3,187,600
MECHANICAL MOVEMENTS
Filed Nov. 14, 1961     7 Sheets-Sheet 2
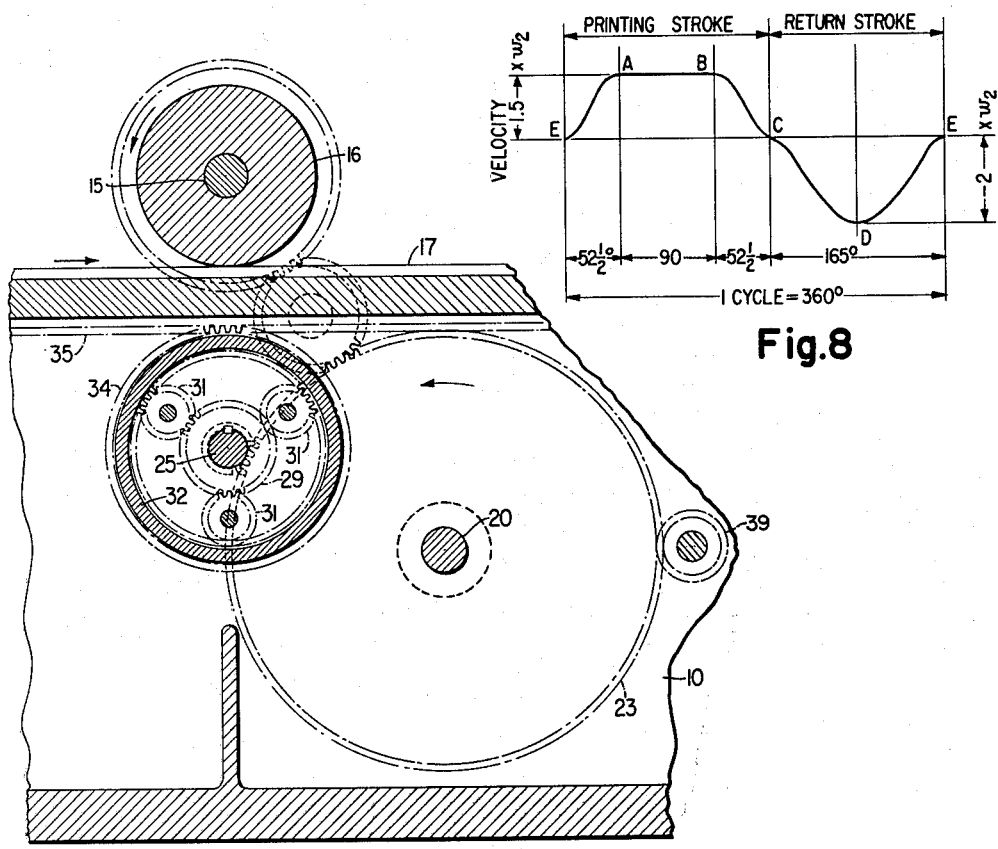
Fig.2
Fig.8
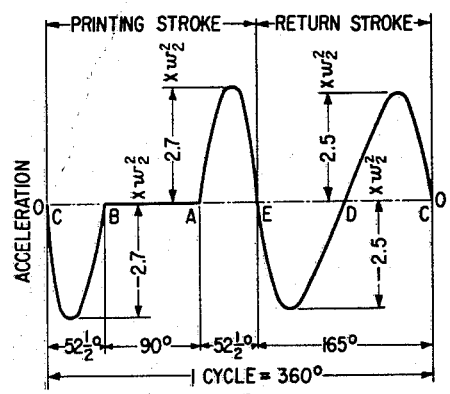
Fig.9
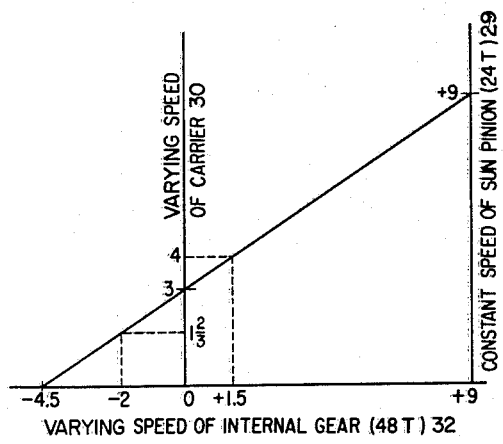
Fig.6
INVENTOR.
Frederick W. Seybold June 8, 1965   F. W. SEYBOLD   3,187,600
MECHANICAL MOVEMENTS
Filed Nov. 14, 1961   7 Sheets-Sheet 3

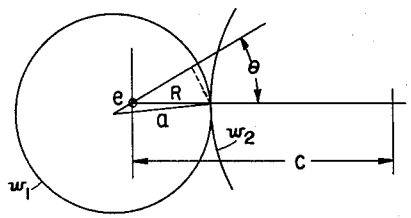

$a^2 = (e+R\cos\theta)^2 + (R\sin\theta)^2$
$= e^2 + 2eR\cos\theta + R^2\cos^2\theta + R^2\sin^2\theta$
$R^2 + 2eR\cos\theta - (a^2 - e^2) = 0$
$R = -e\cos\theta + \sqrt{e^2\cos^2\theta + a^2 - e^2}$   Fig.7

$w_1 R = w_2 (C-R)$ $w_1 = \dfrac{C-R}{R} \times w_2 = \left(\dfrac{C}{-e\cos\theta + \sqrt{e^2\cos^2\theta + a^2 - e^2}} - 1\right) \times w_2$ $\alpha_1 = \dfrac{dw_1}{dt} = w_1 \dfrac{dw_1}{d\theta} = \dfrac{-C\left(e\sin\theta - \dfrac{e^2\cos\theta\sin\theta}{\sqrt{e^2\cos^2\theta + a^2 - e^2}}\right)}{(-e\cos\theta + \sqrt{e^2\cos^2\theta + a^2 - e^2})^2} \times w_1 w_2$ $= \dfrac{-Cw_2^2\left[\left(e\sin\theta - \dfrac{e^2\sin\theta\cos\theta}{\sqrt{a^2 - e^2\sin^2\theta}}\right)(C + e\cos\theta - \sqrt{a^2 - e^2\sin^2\theta})\right]}{(\sqrt{a^2 - e^2\sin^2\theta} - e\cos\theta)^3}$

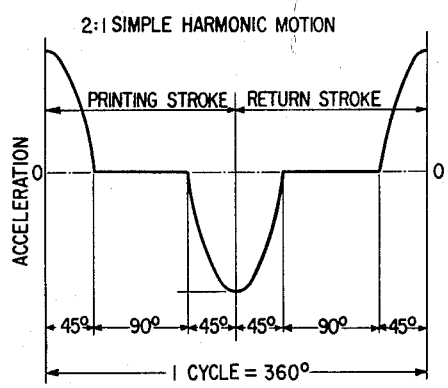

Fig.10

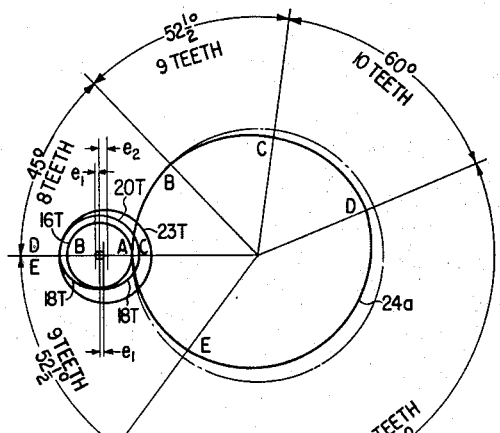

Fig.11

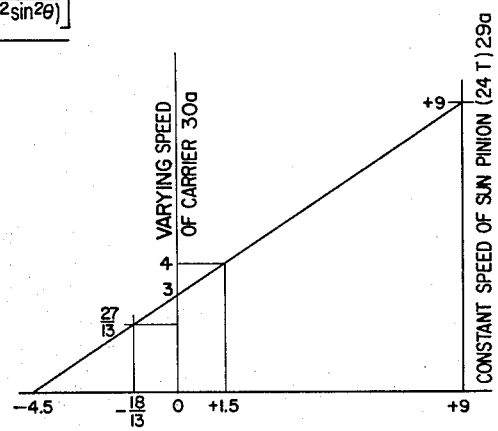

Fig.12

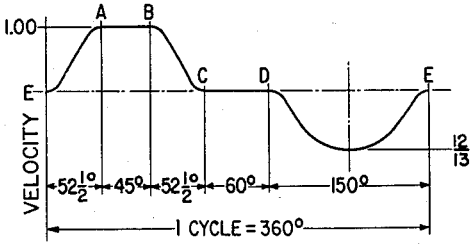

Fig.13

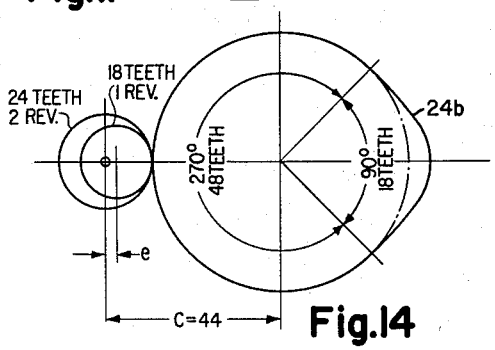

Fig.14

INVENTOR.
Frederick W. Seybold

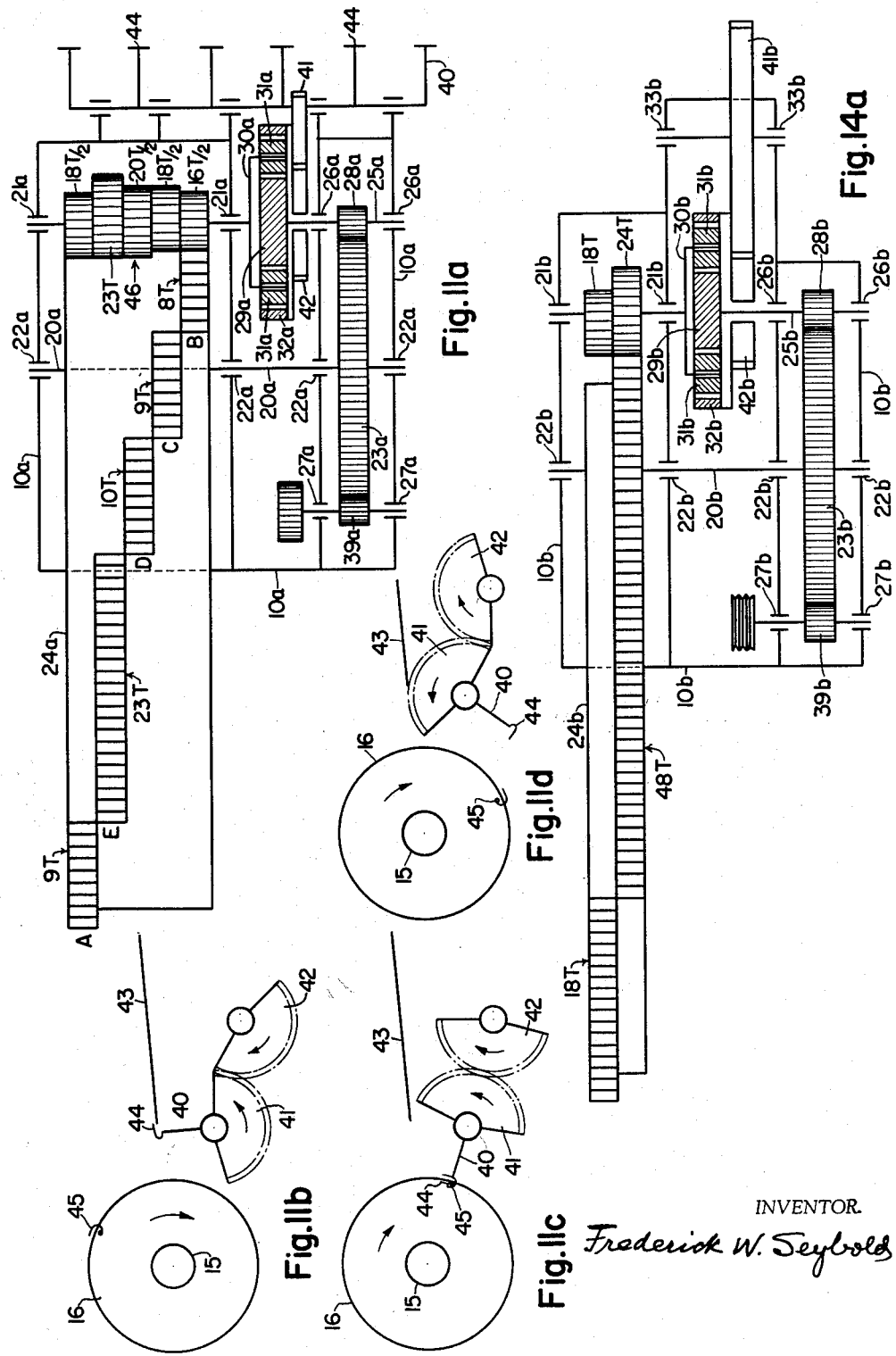

June 8, 1965    F. W. SEYBOLD    3,187,600
MECHANICAL MOVEMENTS
Filed Nov. 14, 1961    7 Sheets-Sheet 5

INVENTOR.
Frederick W. Seybold

June 8, 1965  F. W. SEYBOLD  3,187,600
MECHANICAL MOVEMENTS

Filed Nov. 14, 1961  7 Sheets-Sheet 6

INVENTOR.
Frederick W. Seybold

June 8, 1965 F. W. SEYBOLD 3,187,600
MECHANICAL MOVEMENTS
Filed Nov. 14, 1961 7 Sheets-Sheet 7

INVENTOR.
Frederick W. Seybold

United States Patent Office 3,187,600
Patented June 8, 1965

3,187,600
MECHANICAL MOVEMENTS
Frederick W. Seybold, 1979 Dogwood Drive,
Scotch Plains, N.J.
Filed Nov. 14, 1961, Ser. No. 152,294
15 Claims. (Cl. 74—393)

This invention pertains to mechanical movements which may comprise in sequence a period of rest, acceleration, uniform motion in one direction, deceleration, and motion in the opposite direction at a variable rate of speed. These mechanical movements have zero acceleration at the beginning of motion as well as at the end of the acceleration period.

These mechanical movements are, therefore, distinguished from those which have maximum acceleration at the beginning and maximum deceleration at the end of their movement, as for example, the well-known Scotch Yoke or the pistons of a reciprocating engine, or a cam whose profile conforms to simple harmonic or parabolic acceleration.

This invention is also adaptable to those mechanical, intermittant motions such as the Geneva, in which the beginning acceleration is not zero nor a maximum.

With increased emphasis on higher speeds in modern mechanisms it becomes, therefore, important and desirable that the beginning and end acceleration preferably by zero, so that a minimum of shock is experienced at the start as well as at the termination of the acceleration period.

The combination of the elements of the present invention are particularly adaptable to the reciprocating type bed of a two-revolution cylinder printing press or for the oscillation of the "swing-feed" mechanism of sheet-fed printing presses.

The combination of the elements of this invention is furthermore useful in indexing mechanisms and it is considerably more flexible than the well-known Geneva indexing mechanism. For example, a 4-slot Geneva will index 90 degrees only, while the present mechanical motion may index 180 degrees or more per cycle. Furthermore, the index angle may be greatly varied and it is no longer confined to 120, 90, 72½ and 60 degrees respectively for 3-slot, 4-slot, 5-slot and 6-slot Geneva drives.

The above features and advantages will become apparent when reference is made to the following description taken in connection with the accompanying drawings, in which:

FIGURE 2 is a section taken along line 2—2 of FIGURE 1, showing the planetary gear train;

FIGURE 6 is a speed graph of the components of the planetary gearing;

FIGURE 7 is a formula for computing the angular acceleration of the eccentric pinions shown in FIGURE 3;

FIGURE 8 is the angular velocity diagram of the internal gear or bed gear;

FIGURE 9 is the angular acceleration diagram of the internal gear or bed gear;

FIGURE 10 is the linear acceleration diagram of a 2 to 1 simple harmonic bed motion;

FIGURE 11 is a view of the pitch circles of gearing comprising concentric and eccentric pinions and a staggered segment spur gear applied to the swing-feed mechanism of a sheet feeder;

FIGURE 11a is a diagrammatic plan view of the gearing of the swing-feed mechanism with the compound gear projected upon a plane;

Figure 15:
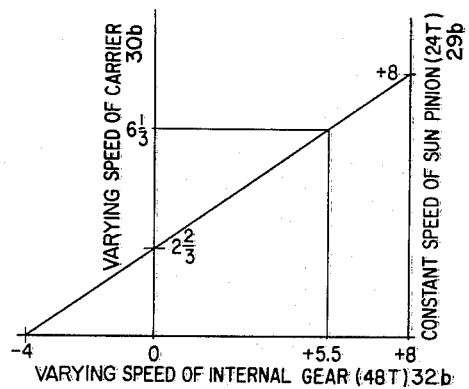
Figure 16:
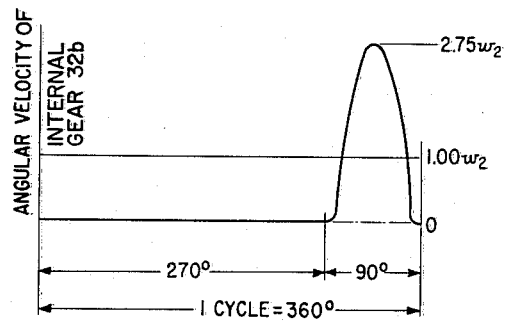
Figure 17:
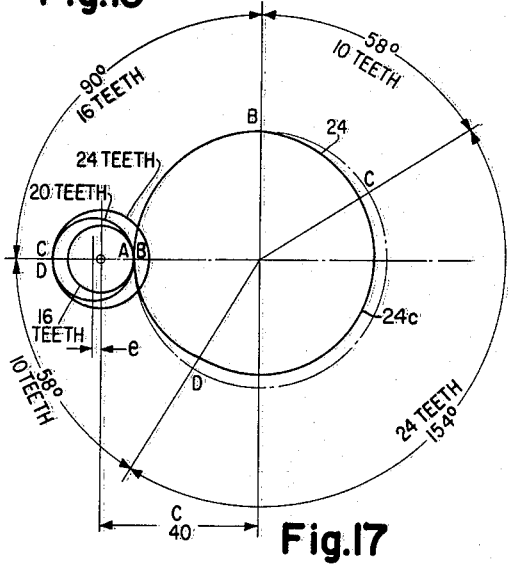
Figure 18:
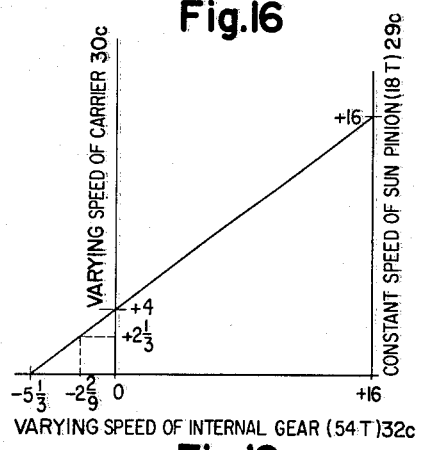
Figure 19:
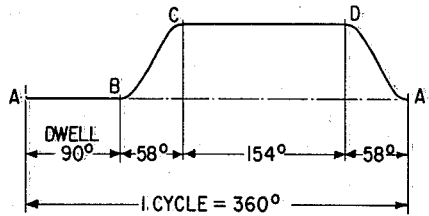
Figure 21:
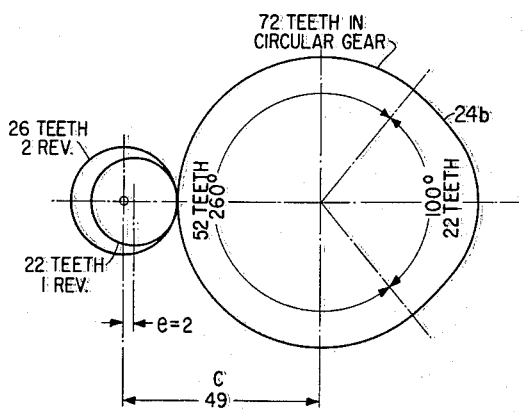
Figure 20:
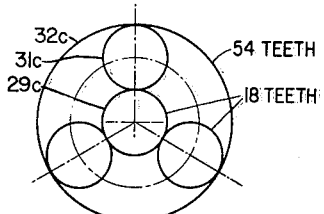
Figure 17A:
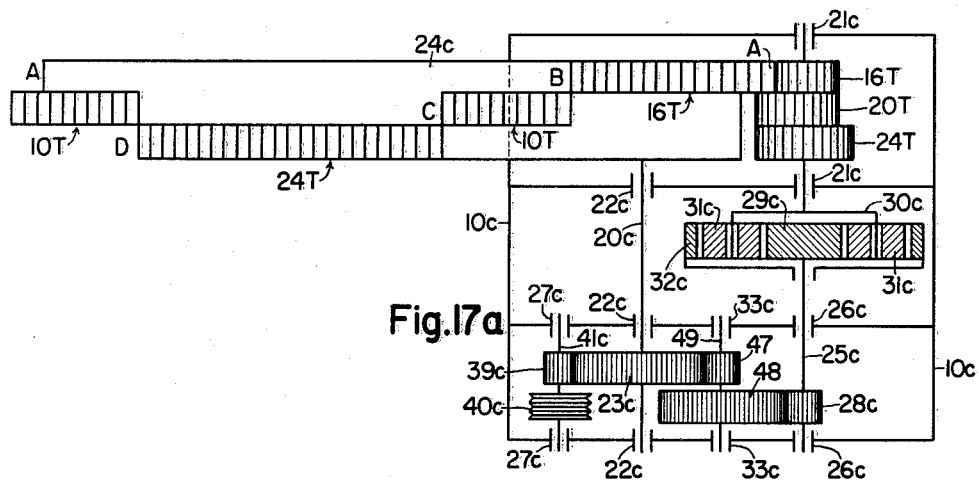
Figure 17B:
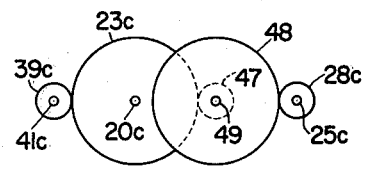
Figure 25A:
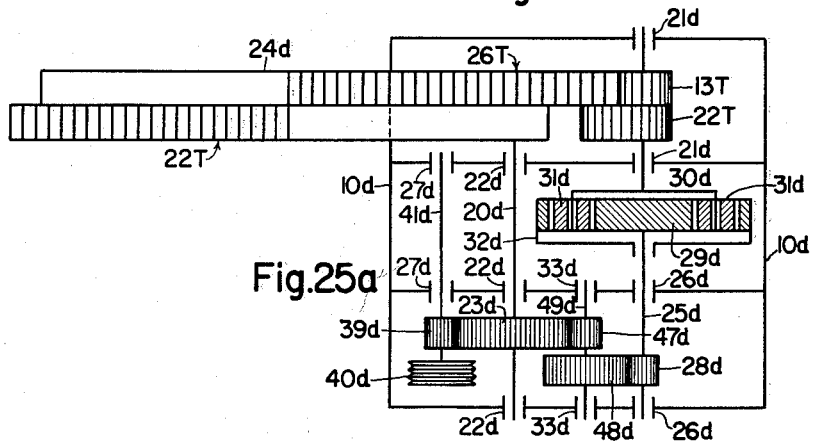
Figure 25B:
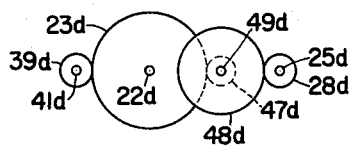
Figure 22:
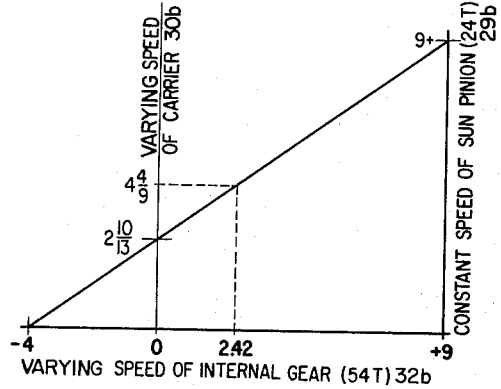
Figure 24:
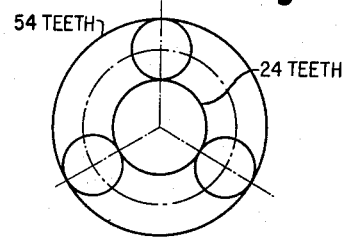
Figure 26:
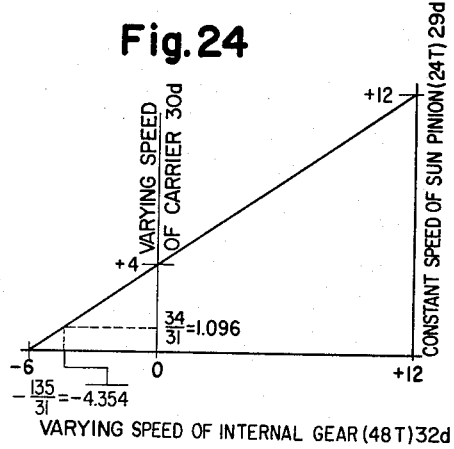
Figure 23:
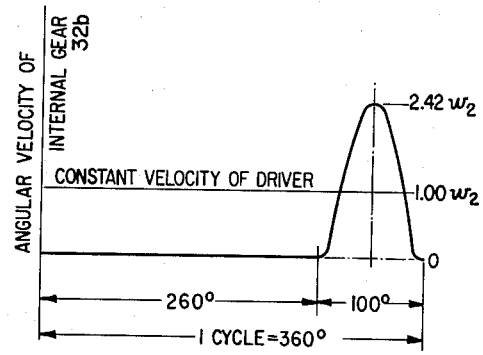
Figure 25:
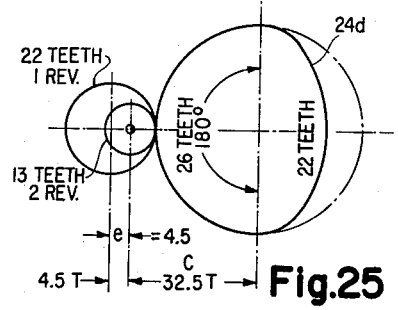
Figure 27:
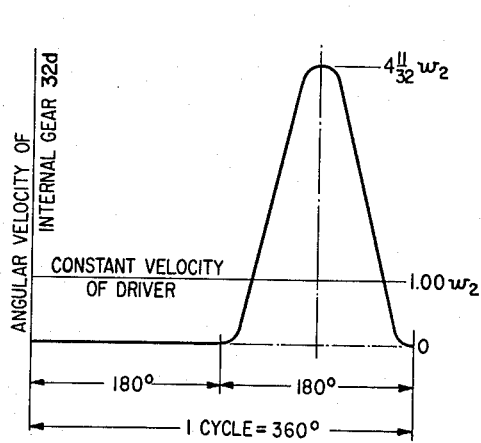

FIGURES 11b, 11c, and 11d are the swing-feed grippers in several different positions relative to the impression cylinder grippers during one cycle;

FIGURE 12 is a speed graph of the planetary gearing thereof;

FIGURE 13 is the angular velocity diagram thereof;

FIGURE 14 is a view of the pitch lines of gearing comprising one concentric pinion, one eccentric pinion and a staggered segment spur gear for indexing an output shaft 180 degrees during ¼ cycle;

FIGURE 14a is a diagrammatic plan view similar to FIGURE 11a of the gearing of the indexing mechanism;

FIGURE 15 is a speed graph of the planetary gearing thereof;

FIGURE 16 is the angular velocity diagram thereof;

FIGURE 17 is a view of the pitch lines of gearing comprising two concentric pinions and one eccentric pinion driven by a staggered segment spur gear which will produce an output motion which may be used as a substitute for an internal Geneva drive;

FIGURE 17a is a diagrammatic plan view of the gearing of the substitute mechanism for an internal Geneva drive;

FIGURE 17b is a diagrammatic elevational view of the compound gearing thereof;

FIGURE 18 is the speed graph of the components of the planetary gearing;

FIGURE 19 is the angular velocity diagram thereof;

FIGURE 20 is the planetary gear train for the above internal Geneva substitute;

FIGURE 21 is a view of the pitch lines of gearing comprising one concentric pinion and one smaller eccentric pinion driven by a staggered conjugate segment spur gear which will produce an indexing motion of 100 degrees;

FIGURE 22 is the speed graph of the components of the planetary gearing;

FIGURE 23 is the angular velocity diagram thereof;

FIGURE 24 is the planetary gear train for the above indexing mechanism;

FIGURE 25 is a view of the pitch lines of gearing comprising one concentric pinion and one larger eccentric pinion driven by a staggered conjugate segment spur gear which will produce an indexing motion of 540 degrees or 1½ revolutions per cycle;

FIGURE 25a is a diagrammatic plan view of this indexing mechanism;

FIGURE 25b is an elevation view of the compound gearing;

FIGURE 26 is the speed graph of the components of the planetary gearing;

FIGURE 27 is the angular velocity diagram thereof.

*General arrangement*

This mechanical movement consists of four spur gear elements which rotate at different integral number of revolutions per cycle. The first or principal driving element makes one revolution per cycle at constant speed and comprises two large spur gears, one of which drives a second element composed of one or more concentric and one or more eccentric spur gears and this second element makes three revolutions per cycle. The latter element is integral with the carrier of a differential planetary gear set, the sungear thereof being the third element of this mechanical movement.

The internal gear of the planetary gear set, being the fourth element of this mechanical movement, usually is the output member and performs the desired sequence of motion. The previously mentioned third (sun gear) element has a pinion connected thereto and it meshes with the other circular spur gear of the principal driving element and the latter imparts to said pinion six or more revolutions per cycle.

The large spur gear of the first element which engages the pinions of said second element has a non-circular form as well as staggered tooth sections to mate with the concentric and eccentric pinions, and the number of teeth contained in this non-circular gear is equal to the sum of the teeth of the several pinions which mesh therewith.

Figure 1:
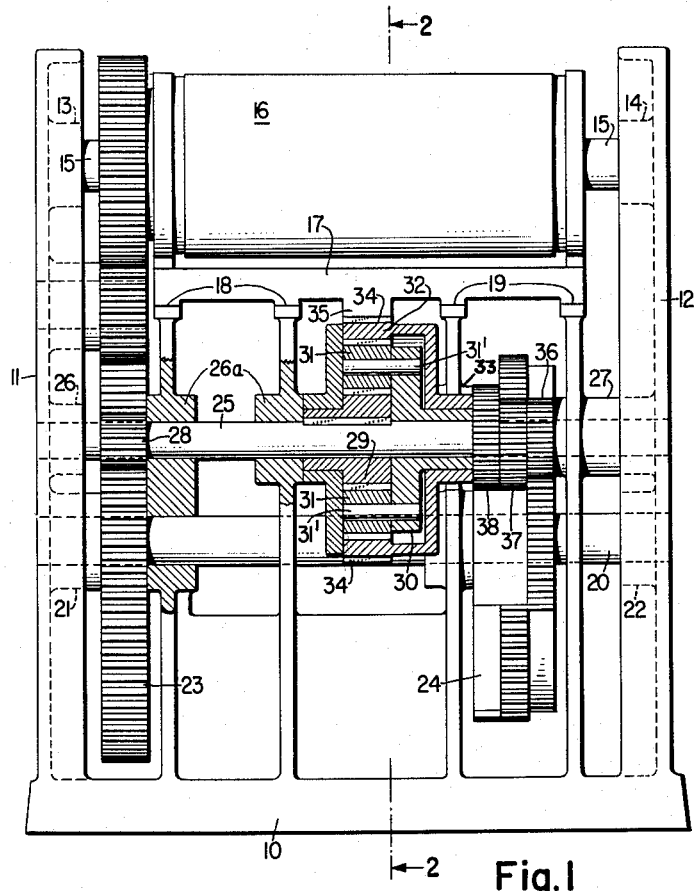
FIGURE 1 is an end view of a flat-bed printing press incorporating the new bed motion.

The printing press shown in FIGURE 1 is of the flatbed, two revolution, constant speed cylinder type and it is provided with a base 10 upon which are mounted the side frames 11 and 12 in which are located suitable bearings 13 and 14 for the axle 15 of the impression cylinder 16. The reciprocating type bed is illustrated at 17 and it usually is provided with four tracks and roller trucks 18 which cooperate with suitable supports 19 on the base 10. The mechanism for raising and lowering the impression cylinder 16 is well known in the art and need not be illustrated further.

A main constant speed drive shaft 20 is supported in bearings 21 and 22 in the side frames 11 and 12 respectively and keyed to said shaft is the circular spur gear 23 as well as the staggered segment spur gear 24. The spur gear 23 is driven by a pinion 39 and the latter is driven by V-belts from a suitable motor (not shown).

A second driven shaft 25 is supported in bearings 26, 26a and 27 in the side frames 11 and 12 respectively and to said shaft the "feed-back" pinion 28 and the sun gear 29 are keyed. The term "feed-back" is used here in a sense similar to that indicated in my prior Patents No. 2,701,480, No. 2,950,631, and others. The planetary pinion carrier 30 is rotatably supported on shaft 25. Several planetary pinions 31 are rotatably mounted on studs 31' integral with the carrier 30. The pinions 31 mesh with sun gear 29 and an internal gear 32 whose hub portion is rotatably mounted on the hub portion of the carrier 30. The hub of internal gear 32 is journalled in bearing 33 on the base 10. The internal gear 32 is also provided with external teeth 34 which engage a rack 35 secured to the underside of the type bed 17.

Secured to the hub of the carrier 30 are three pinions of various size. The smallest pinion 36 is concentrically mounted relative to the shaft 25. Next to pinion 36 is a larger eccentrically mounted pinion 37 and next thereto is a still larger eccentrically mounted pinion 38. It is to be noted that the eccentricities of pinions 37 and 38 are diametrically opposite and the pitch circles of pinions 36 and 37 are tangent at one point, while the pitch circles of pinions 37 and 38 are tangent diametrically opposite therefrom.

Figure 4:
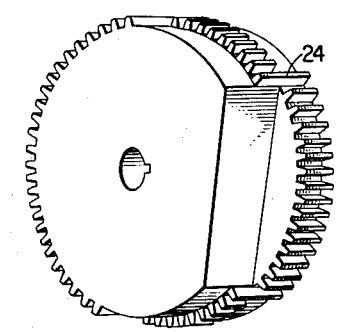
FIGURE 4 is a perspective view of the staggered segment spur gear.

This eccentric mounting arrangement of the pinions 37 and 38 results in the non-circular form of the staggered segment spur gear 24 as shown in FIGURE 4 so that each of the three pinions 36, 37 and 38 mesh with their respective gear segment only.

In the design illustrated pinion 36 has 16 teeth, pinion 37 has 18 teeth and pinion 38 has 25 teeth, therefore, spur gear 24 has a total of 59 teeth, which is equal to the sum of the teeth of the three pinions. For each revolution of gear 24 the carrier 30 to which pinions 36, 37, and 38 are secured will make three revolutions. Pinions 28 and 29 make nine revolutions for each revolution of spur gears 23 and 24.

The internal gear 32 has 48 teeth and the sun gear 29 has 24 teeth, so that when the carrier 30 is stationary and the sun gear 29 makes +9 revolutions, then the internal gear 32 makes −4.5 revolutions.

The speedgraph shown in FIGURE 6 is constructed as follows:

(1) Draw a horizontal line on which will be represented the speed and direction of rotation of the internal gear 32, which is the output member.

(2) Draw two perpendicular lines to the above horizontal line and space them a suitable distance apart.

(3) Mark the intersection of the left perpendicular "0" (zero) and that of the right perpendicular +9.

(4) On this left perpendicular will be represented the varying speed and direction of rotation of the carrier 30.

(5) On the right perpendicular indicate the constant speed value of +9 revolutions per cycle of the 24T pinion secured to the second drive shaft 25.

(6) Compute the speed and direction rotation of the 48T internal gear 32 when the carrier 30 is held stationary and the 24T pinion 28 makes +9 revolutions per cycle, i.e. the internal gear 32 makes −4.5 revolutions per cycle.

(7) Mark off on the horizontal line to the left of "0," −4.5 equal to ½ the distance between the two perpendicular lines.

(8) Draw a straight line from +9 on the right perpendicular to −4.5 on the horizontal line, and note the intersection of this line with the left perpendicular.

(9) Mark this intersection +3, this value being readily determined by proportion.

The speed and direction of rotation as well as standstill of the internal gear or output member 32 is determined by the constant speed of the sun gear 29 of the planetary gear set and the varying speed of its carrier 30.

The speedgraph shown in FIGURE 6 indicates that when the carrier 30 rotates at the rate of +3 rev. and the sun gear 29 rotates at the rate of +9 rev. the internal gear 32 remains at rest.

In order that the carrier 30 rotate during its first revolution at the rate of +4 rev. the gear ratio between the concentric pinion 36 secured to the carrier 30 and the concentric portion of the noncircular gear 24 must be 4:1, because the latter makes 1 revolution per cycle, so that if the concentric pinion has 16 teeth, gear 24 would require 64 teeth in a complete gear. Now since pinion 36 makes 1 rev., 16 teeth on the periphery of gear 24 would be needed and these teeth would extend over a 90 degree sector, as from A–B, see FIG. 5.

This, of course, produces the constant speed rate of +1½ for the internal gear 32, as shown below and on the speedgraph, FIG. 6.

| Carrier 30 | Sun Gear 29 | Internal Gear 32 |
|---|---|---|
| +4 Hold +4 | +4 +5 +9 | +4 −2½ +1½ |

Figure 5:
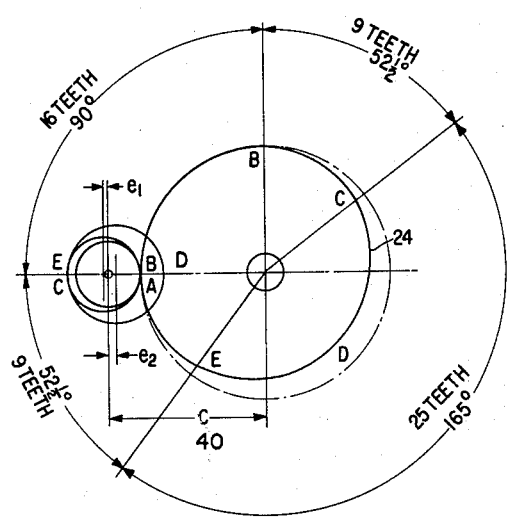
FIGURE 5 is a view of the pitch circles of the gearing comprising concentric and eccentric pinions and the staggered segment spur gear.

The first half of the second revolution of carrier 30 presents eccentric pinion 37 to the noncircular gear 24, pinion 37 having 18 teeth, during ½ revolution 9 teeth on gear 24 come into action and since pinion 37 is eccentrically mounted on the carrier 30 the gear ratio will gradually be reduced from a ratio of 4:1 to a ratio of 3:1, when the last of the 9 teeth mates with pinion 37 as at C, see FIG. 5.

At location C on the noncircular gear its size is now equivalent to 60 teeth, pinion 37 for this location due to its eccentricity is then equivalent to a 20 teeth pinion, therefore, the gear ratio is 60/20=3:1, which, of course, means that the internal gear 32 has come to rest, as shown below:

| Carrier 30 | Sun Gear 29 | Internal Gear 32 |
|---|---|---|
| +3 Hold +3 | +3 +6 +9 | +3 −3 0 |

The second half of the second revolution of carrier 30 presents eccentrically mounted pinion 38, having 25 teeth, to the noncircular gear 24, whereby 12½ teeth extending from C–D thereon come into action. During this engagement the internal gear 32, which is at rest at this location C, must be accelerated and at location D on the noncircular gear 24 its size is now equivalent to 50 teeth, pinion 38 for this location has then a size equivalent of 30 teeth due to its eccentric mounting, therefore, the gear ratio is 50/30=1⅔, which is the highest speed attained by the internal gear 32 in the reverse direction and it rotates at the rate of −2 revolutions, as shown below:

| Carrier 30 | Sun Gear 29 | Internal Gear 32 |
|---|---|---|
| +1⅔ | +1⅔ | +1⅔ |
| Hold | +7⅓ | −3⅔ |
| +1⅔ | +9 | −2 |

The first half of the third revolution of carrier 30 presents the remaining half, or 12½ teeth, of pinion 38 to the noncircular gear 24, whereby 12½ teeth extending from D–E thereon come into engagement, thereby slowing down the internal gear 32 from a rate of −2 to 0 (zero) at E, the gear ratio at E being the same as it was at C, i.e. 3:1.

During the second half of the third revolution of carrier 30 the remaining 9 teeth of pinion 37 come into engagement with gear 24 at E and this engagement extends from E–A, and the internal gear 32 will begin to accelerate at E and attain a constant angular speed rate of +4 rev. at A.

As stated in the preamble of this specification this mechanical movement has zero acceleration at the beginning and the end of the acceleration period. A mathematical proof to confirm this assertion is outlined in FIGURE 7. A formula is derived for the angular acceleration $\alpha$ of the planet pinion carrier 30, where:

$a$=pitch radius of the eccentric pinions 37 and 38
$e$=eccentricity of the pinion relative to its center of rotation
$R$=variable, effective driven radius of eccentric pinion
$C$=center distance between shafts 20 and 25
$\omega_1$=variable angular velocity of carrier 30
$\omega_2$=constant angular velocity of non-circular gear 24

When $\theta=0$ degree, $a,e$, and R will fall on the center distance C and the sine of zero degrees is zero, then the quantity in the first parenthesis of the equation is equal to zero, therefore, the angular acceleration at the beginning is zero. Likewise, when $\theta=180$ degrees, since the sine of 180 degrees is also zero, the angular acceleration at the end of the period is also zero.

When calculating the values of the acceleration it is convenient to assume 8 units for "$a$" for the radius of the 16 teeth concentric pinion 36, 9 units for "$a$" for the radius of the 18 teeth eccentric pinion 37, whereby the eccentricity "$e_1$" of pinion 37 relative to the center of rotation is equal to unity.

The spur gear 24 when it is engaged with pinion 36 would have 64 teeth in a complete, circular gear or 32 units, therefore, the center distance C would be the sum of 8 units for pinion 36 and 32 units for gear 24 or 40 units for the purpose of computation. Likewise, for pinion 38, "$e_2$" is equal to 2½ and "$a$"=12.5 and "$C$"=40, or "$e_2$"=1, "$a$"=5 and "$C$"=16, for simplicity in performing the calculations.

The maximum value for the angular acceleration when the eccentric pinion 37 on the carrier 30 is driven by spur gear 24 is $1.80\omega_2^2$, and when gear 24 drives the eccentric pinion 38 the maximum angular acceleration is $1.68\omega_2^2$.

The angular acceleration of the internal gear 32 is 1½ times that of the carrier 30 and the linear acceleration in ft. per sec. per sec. of the type bed 17 is equal to the angular acceleration of internal gear 32 multiplied by the pitch radius (in feet) of the external gear 34.

For example, a flat bed printing press, incorporating this new movement, is operating at the rate of 3600 impressions per hour, and this would be at the rate of one impression per second, i.e. one complete reciprocation of the type bed per second or one revolution of gears 23 and 24, or equal to an angular velocity $\omega_2=2\pi$ radians per second.

The uniform motion of the type bed covers ¼ cycle, the pinion 28 during this ¼ cycle makes 9/4 revolutions, resulting in −1.125 revolutions of the internal gear 32, but 1.000 revolution of pinion 36 on carrier 30 results in +1.500 revolutions of internal gear 32, leaving a net of +.375 revolution for internal gear 32.

The varying speed motion of the type bed 17 during the printing stroke covers 105/360 of a cycle, the "feedback" pinion 28 makes then $$\frac{105\times 9}{360}=2.625 \text{ revolutions}$$

and, therefore, the internal gear 32 makes −1.3125 revolutions, then for 1.000 revolution of pinion 37 on carrier 30 results in +1.500 revolutions of internal gear 32, leaving a net of +.1875 revolution for internal gear 32.

The total revolution of internal gear 32 is, therefore, the sum of the above net motions, or $$+.375+.1875=+.5625$$

revolution of gears 32 and 34.

Assuming that the entire stroke of type bed 17 is 36 inches, then 24 inches will be at a uniform speed and this represents ¼ cycle, during which the impression cylinder makes ½ revolution. Its diameter is, therefore, $$D=\frac{24\times 2}{\pi}=15.3 \text{ inches}$$

The bed gear 34 has then a pitch radius $$r=\frac{24\times 8}{2\pi\times 3}=10.2 \text{ inches}$$

The maximum linear acceleration of the type bed 17 is then $$A\frac{1.5\times 1.8\times 4\pi^2\times 10.2}{12}=90.6 \text{ feet}$$

per sec. per sec.

For comparison, the well-known 2:1 harmonic reverse bed motion, having an equal length of bed stroke, i.e. 36 inches, would require an impression cylinder diameter of $$\frac{36}{1+\pi/2}=14 \text{ inches}$$

and, therefore, a reversing crank length of 7 inches.

The linear acceleration A of the type bed for simple harmonic motion is expressed by the formula:

$$A=r \sin \alpha\omega^2$$

where $r$=reversing crank length, ft.
$\alpha$=crank angle, measured from the vertical, and its maximum value is 90°, sin 90°=1.0000, or in other words the reversing crank is on dead center, i.e. at the beginning and end of the stroke.
$\omega$=angular velocity of reversing crank, radians per sec. =$4\pi$ radians per sec. for a press speed of 3600 impress. per hour or one per second.
$A=7/12\times 1.000\times (4\pi)^2=92.2$ feet per sec. per sec.

The new mechanical motion, therefore, compares favorably with existing bed motions in respect to the maximum acceleration attained. However, the new bed motion has zero value, at the beginning and end of the acceleration period, whereas in simple harmonic acceleration the maximum value occurs at the beginning of an acceleration period, however it reaches zero value at the end of the acceleration period.

It should also be noted that the torque imparted to carrier 30 is divided between the internal gear 32 and the sun gear 29, the latter receiving ⅓, and the internal gear 32 receiving ⅔ thereof, when the sun gear is ½ the size of the internal gear 32.

The swing-feed mechanism of a sheet feeder is illustrated in FIGURES 11, 11a, 11b, 11c and 11d, and generally consists of an oscillating gripper bar 40 which must have a period of rest, D–C, see FIGURE 13, for "positioning" a sheet lying on the feedboard 43 against the forwarding grippers 44 and "side-guiding" it for proper register, see FIG. 11b. Thereafter the gripper bar 40 will be accelerated from C–B to impression cylinder speed and at this constant speed, which is maintained for a period, the sheet is accurately transferred to the impression cylinder 16. After said transfer has been completed the bar 40 is decelerated, A–E, to zero speed and then accelerated and decelerated to return it to its starting position at D.

Figure 3:
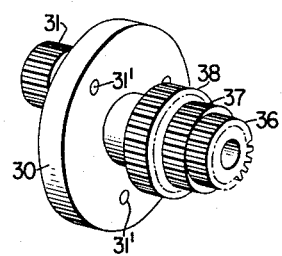
FIGURE 3 is a perspective view of the concentric and eccentric pinions integral with the three-revolution pinion carrier.

In FIGURE 11 and FIG 11a is shown the arrangement of the concentric and eccentric pinions in relation to the non-circular gear 24a, which is composed of five gear segments which are shown in planar projection in FIG. 11a in order to clearly show the position of the five gear segments relative to their corresponding pinions, five in number and indicated by reference numeral 46. These pinions are secured to the carrier 30a, which also is provided with two or more planetary pinions 31a, similar to those shown in FIGS. 2 and 3, which mesh with the output member or internal gear 32a. Pinions 31a also engage the sun gear 29a, the latter being compounded with the pinion 28a which meshes with the large circular gear 23a. A segment gear 42 is secured to the internal gear 32a and the former meshes with a segment gear 41 secured to the swing-feed gripper bar 40 on which several grippers 44 are mounted. The opening and closing of the grippers 44 is accomplished by cams and this method is well known in the art.

The driving power for the swing-feed mechanism is derived from a pinion 39a, the latter being driven from a suitable power connection on the printing press. Pinion 39a meshes with the circular gear 23a which is secured to shaft 20a, noncircular gear 24a is also secured to said shaft, which is journalled in suitable bearings 22a in frame 10a. A second shaft 25a has secured thereto the two pinions 28a and 29a and is supported on bearings 21a of the frame 10a. During the constant speed portion of the cycle from B–A, which extends over 45 degrees, 8 teeth of the non-circular gear 24 mesh with ½ of a concentrically mounted pinion having 16 teeth in a complete part. Then follows the deceleration period, A–E, where 9 teeth of non-circular gear 24 mesh with ½ of an eccentrically mounted pinion having 18 teeth in a complete part.

Thereafter follows the return motion of the gripper bar 40, said motion extending over 150 degrees of the cycle from E–D, where 23 teeth of the conjugate gear 24 mesh with an eccentrically mounted pinion also having 23 teeth. Then follows a period of rest from D–C, extending over 60 degrees of the cycle, where 10 teeth of a concentrically mounted pinion having 20 teeth in a complete part mesh with 10 teeth of the non-circular gear 24.

Thereafter follows another acceleration period from C–B, where 9 teeth of the non-circular gear 24 mesh with ½ of another eccentrically mounted pinion also having 18 teeth in a complete part, thus completing one cycle. The planetary gear set is identical with that previously described, see FIGURE 12, and the internal gear 32a oscillates 135 degrees during one cycle.

FIGURES 14, 15 and 16 pertain to a substitute for the well-known 4-slot Geneva indexing mechanism. However the latter suffers from the kinematic defect that at the entrance of the driving roller into the slot the acceleration of the driven member is not zero, but $\alpha_1 = \omega_2^2$, where $\omega_2$ is the angular velocity of the driving roller.

There is no physical resemblance between this indexing mechanism and the well-known Geneva device, but the sole purpose of either device is to turn an output member through a fraction of a revolution, usually 90 degrees or less, for one complete revolution of the input or driving member, thereby creating a standstill or dwell period of the driven or output member.

FIGURE 14a shows the general arrangement of the gearing comprising the new indexing mechanism. The four principal gear elements of the two previously described devices are also present in this device which utilizes only one eccentrically (18T) and one concentrically (24T) mounted pinion on carrier 30b, which is journalled in bearings 21b of the frame 10b, said carrier making 3 revolutions per cycle, these two pinions mate with teeth on the non-circular gear 24b which is shown as projected onto a plane or in aligned form, in FIGURE 14a. Gear 24b and a circular gear 23b are secured to a constant speed shaft 20b which turns in bearings 22b of the frame 10b, and this shaft makes one revolution per cycle. Planetary pinions 31b are provided on carrier 30b and these mesh with the output or internal gear member 32b and the sun gear 29b, which together with pinion 28b is secured to shaft 25b, the latter turning in bearings 26b of the frame 10b and makes 8 revolutions per cycle. Pinion 28b meshes with the circular gear 23b, the gear ratio being 1:8. A segment gear 42b is attached to the internal gear 32b and mates with output segment gear 41b, the gear ratio being 1:2, and is journalled in bearings 33b. The driving power may be applied to gear 23b through pinion 39b, which may be driven by means of V-pulley and belts.

The formula for computing the angular acceleration of the carrier on which the concentric 24 teeth and the eccentric 18 teeth pinions, shown in FIGURE 14, are mounted is the same as given in FIGURE 7, and in this case $C=44$, $a=9$, and $e=3$, and the approximate value for $\alpha_1 = 10.4\omega_2^2$, which maximum occurs when $\theta = 65°$.

The maximum angular acceleration of the internal gear is 1.5 times $10.4\omega_2^2 = 15.6\omega_2^2$. However, since the internal gear makes ½ revolution per cycle and a 4-slot Geneva makes only ¼ revolution per cycle, the part to be indexed would, therefore, be geared 1:2 from the internal gear, and its resulting maximum angular acceleration would be ½ of $15.6\omega_2^2$, or $7.8\omega_2^2$. The latter value is considerably higher than the value of $5.41\omega_2^2$ of a standard 4-slot Geneva.

The maximum angular velocity of the internal gear is $5.5\omega_2$, see FIGURE 15, and that of the part to be indexed equals ½ of $5.5\omega_2$ or $2.75\omega_2$, see FIGURE 16. The maximum angular velocity of a standard 4-slot Geneva is $2.42\omega_2$.

FIGURES 17, 18, 19 and 20 pertain to a substitute for the well-known internal Geneva for indexing a member 90 degrees when ¾ part of a cycle is available for such indexing.

In FIGURES 17 and 17a is shown the arrangement of the concentric (16T and 24T) and eccentric (20T) pinions in relation to the conjugate, non-circular gear 24c. This device differs very little from the first device, which has been described in great detail. Both devices have three pinions secured to their carrier, the first device has one concentric pinion and two eccentrically mounted pinions, while the device about to be described has two concentric (16T and 24T) pinions and only one eccentrically mounted (20T) secured to the carrier 30c, which makes 3 revolutions per cycle. These three pinions mate with the teeth on the non-circular gear 24c which is shown in planar or aligned form in FIGURE 17a. Gear 24c and circular gear 23c are fastened to a constant speed shaft 20c which turns in bearings 22c of the frame 10c, and this shaft makes one revolution per cycle. Planetary pinions 31c are provided on the carrier 30c and these mesh with the output or internal gear member 32c and the sun pinion 29c, which together with pinion 28c is secured to shaft 25c, the latter turning in bearings 26c of the frame 10c and this shaft makes 16 revolutions per cycle, see FIGURE 18.

Since the speed ratio between shaft 20c and shaft 25c is 16 to 1, compound gearing is resorted to through the use of a pinion 47 and a gear 48 secured on an intermediate shaft 49 which turns in bearings 33c of the frame 10c, as shown in FIGURE 17b. The driving power is applied to gear 23c through pinion 39c which is driven by a V-pulley 40c, and they are secured to shaft 41c turning in bearings 27c of the frame 10c. In FIGURE 19, the dwell portion, i.e. when the member to be indexed remains stationary, extends from A–B or ¼ cycle=90 degrees, the concentric pinion having 16 teeth meshes with 16 teeth of gear 24c, these teeth being concentric with the shaft center of gear 24c.

The acceleration period extends over 58/360 cycles or from B–C when 10 teeth of the 20 teeth pinion, which is eccentrically mounted on the carrier, mesh with 10 teeth of the non-circular gear 24c. Then the concentrically mounted 24 teeth pinion engages the non-circular gear 24c from C–D, imparting a uniform angular velocity to the driven member, see FIGURE 19. A deceleration period begins when the remaining 10 teeth of the eccentrically mounted 20 teeth pinion on the carrier engages the teeth extending from D–A on the non-circular gear 24c, thereby completing the cycle.

The planetary gear set is shown in FIGURE 20, in which the internal gear has 54 teeth and the sun gear and planet pinions each have 18 teeth, so that when the sun gear makes 16 revolutions per cycle and the carrier rotates at the rate of 4 revolutions per cycle then the internal gear with 54 teeth will remain stationary, see FIGURE 18.

The engagement of the concentric tooth section A–B of non-circular gear 24c meshing with the concentrically mounted 16 teeth pinion on the carrier results in one revolution of the carrier at the rate of 4 revolutions per cycle. The engagement of sections B–C and D–A with the 20 teeth eccentrically mounted pinion results in one more revolution of the carrier, while the engagement of section C–D with the concentrically mounted 24 teeth pinion results in one additional revolution of the carrier, making a total of 3 revolutions per cycle.

The maximum value for the angular acceleration of the carrier $\alpha_1=-2.83\omega_2^2$ is again computed by the formula of FIGURE 7, the values for $C=40$, $a=10$ and $e=2$, said maximum angular acceleration occurs when $\theta=65°$ approximately.

The maximum angular acceleration of the internal gear is 4/3 times $2.83\omega_2^2=3.77\omega_2^2$. Since the internal gear 32c is indexed 480 degrees per cycle and the required indexing angle is only 90°, a gear ratio of 480/90 or 16/3 is employed, whereby the maximum angular acceleration of the member to be indexed is 3/16 of $3.77\omega_2^2$ or $.707\omega_2^2$.

The maximum angular acceleration of a 4-slot internal Geneva occurs at entrance of the driving roller into the slot and is equal to $\alpha_1=\omega_2^2$, where $\omega_2$ is the angular velocity of the driving roller.

While the maximum angular acceleration in the new indexing mechanism is only 70% of that of the standard internal Geneva, the former's maximum acceleration does not occur at the beginning of the indexing cycle as it does with the standard internal Geneva. In the new indexing mechanism the angular acceleration is zero at the beginning of an indexing cycle.

FIGURES 21, 22 and 23 pertain to still another form of indexing substitute for 3-slot or 4-slot Geneva indexing mechanisms and which develops more favorable angular velocity and acceleration characteristics compared to those of standard Genevas and to the substitute mechanism described in FIGURES 14, 15 and 16.

The period for indexing is 100 degrees per cycle and the period of rest is, therefore, 260 degrees, see FIGURE 21. A 26 teeth pinion is concentrically mounted on the carrier and it makes 2 revolutions while meshing with the 52 concentric teeth (a complete circular gear would have 72 teeth) of the noncircular gear 24. An eccentrically mounted pinion on the carrier having 22 teeth makes one revolution when meshing with 22 teeth of gear 24. In this mechanism the internal gear has 54 teeth (see FIG. 24) and the sun gear has 24 teeth, so that when the latter makes +9 revolutions the internal gear will make −4 revolutions and the carrier is held stationary, the speed graph of FIGURE 22 is constructed accordingly.

In order that the internal gear remain stationary the carrier must make $+2\ 10/13$ revolutions at constant speed for each +9 revolutions of the sun pinion according to the speed graph. This speed ratio is satisfied by $72/26=2 10/13$, which is the gear ratio between the concentric pinion on the carrier and the concentric portion of the noncircular gear 24, see FIGURE 21.

While the carrier makes 2 revolutions at constant speed the sun pinion will then have made 6.5 revolutions with the internal gear remaining at rest. After the carrier has completed its 2 revolutions at constant speed the eccentrically mounted pinion having 22 teeth will engage the 22 teeth of the conjugate gear 24 and after another ½ revolution of the carrier it will have attained a speed ratio of $40/9=4 4/9$, and the internal gear will have attained a maximum angular velocity of $2.42\omega_2$.

During this portion of the cycle the carrier will make its third revolution and the sun pinion will make 2.5 revolutions, thereby making a total of 9 revolutions per cycle for the sun pinion. The internal gear is in motion during this part of the cycle and it will turn 120 degrees in the same sense as the carrier.

The maximum value for the angular acceleration of the carrier, $\alpha_1=3.20\omega_2^2$ is again computed by the formula of FIGURE 7, the value for $C=49$, $a=11$, $e=2$, and the maximum angular acceleration occurring when $\theta=70°$ approx.

The internal gear has a maximum angular acceleration of $13/9 \times 3.20\omega_2^2 = 4.62\omega_2^2$ when indexing it 120 degrees whereas the maximum angular acceleration for a standard 3-slot Geneva has a value of $31.42\omega_2^2$.

This indicates a considerable improvement even though somewhat more time must be allowed for indexing, i.e. 100° vs. 60°. In order to make this new mechanism index 90 degrees only, a gear ratio of 3:4 is employed, whereby the maximum angular velocity will be reduced from $2.42\omega_2$ to $1.82\omega_2$ and the maximum angular acceleration will be reduced from $4.62\omega_2^2$ to $3.46\omega_2^2$.

These values compare more favorably with a standard 4-slot Geneva, which has a maximum angular velocity of $2.42\omega_2$ and an angular acceleration of $5.41\omega_2^2$.

From the standpoint of stored kinetic energy at midstroke the following data is noted: Standard 4-slot Geneva, maximum angular velocity=$2.42\omega_2$; New indexing mechanism, maximum angular velocity=$1.82\omega_2$.

Since the kinetic energy varies as the square of the angular velocity, the ratio $$\frac{(2.42)^2}{(1.82)^2}=\frac{5.84}{3.30}=1.77$$

therefore, the speed of the new indexing motion could be increased $\sqrt{1.77}=1.33$, or 33%, in order to equal the stored kinetic energy of the standard 4-slot Geneva.

FIGURES 25, 25a, 25b, 26 and 27 pertain to still another form of indexing mechanism in which ½ cycle is available for performing the indexing operation. Various index angles per cycle may be obtained by gearing up or down from the internal gear.

FIGURE 25a shows the general arrangement of the gearing comprising this ½ cycle indexing mechanism.

A 13 teeth pinion, which makes two revolutions per cycle is concentrically mounted on the carrier 30d and meshes with 26 concentric teeth of the non-circular gear 24d extending over 180 degrees thereof. Mounted eccentrically on the carrier is a pinion having 22 teeth which mesh with 22 teeth of the non-circular gear 24d, this pinion making the third revolution for the carrier.

Carrier 30d is journalled in bearings 21d of the frame 10d. Gear 24d and a circular gear 23d are secured to a constant speed shaft 20d which turns in bearings 22d of the frame 10d, and this shaft makes one revolution per cycle. Planetary pinions 31d are provided on carrier 30d and these pinions mesh with the output or internal gear 32d and the sun gear 29d, which together with the pinion 28d is secured to the shaft 25d, the latter turning in bearings 26d of the frame 10d and this shaft makes 12 revolutions per cycle, see FIGURE 26.

Since the speed ratio between shafts 20d and 25d is 12 to 1 compound gearing will avoid the use of a small number of teeth on pinion 28d, hence an intermediate shaft 49d, to which compound pinion 47d and compound gear 48d are fastened, is interposed between gear 23d and pinion 25d. Intermediate shaft 49d turns in bearings 33d of the frame 10d, see FIGURE 25b. The driving power is applied to gear 23d through 39d which is driven by V-pulley 40d, and they are secured to shaft 41d turning in bearings 27d of the frame 10d.

In this mechanism the internal gear has 48 teeth and the sun pinion has 24 teeth, so that when the latter makes +12 revolutions the internal gear will make −6 revolutions and the carrier is held stationary. The speed graph shown in FIGURE 26 is constructed accordingly.

In order that the internal gear remain stationary the carrier must make +4 revolutions for each +12 revolutions of the sun pinion according to the speed graph. This speed ratio is satisfied by 52/13=4, which is the gear ratio between the concentric portion of the non-circular gear 24 and the concentrically mounted pinion with 13 teeth, see FIGURE 25.

While the carrier makes 2 revolutions at constant speed the sun pinion will have made 6 revolutions, the internal gear meanwhile remaining at rest. After the carrier has completed its 2 revolutions at constant speed the eccentrically mounted pinion having 22 teeth will engage the 22 teeth of the non-circular gear 24 and after another ½ revolution of the carrier it will have attained a speed ratio of 17/15.5 or 34/31=1.096 and the internal gear will have attained an angular velocity of $$-135/31\omega_2 = -4.354\omega_2$$

During this portion of the cycle the carrier will make its third revolution and the sun pinion will make an additional 6 revolutions, thereby making its required 12 revolutions per cycle. The internal gear is in motion during this part of the cycle and it turns −540 degrees, i.e. it turns in the opposite sense relative to the carrier and sun pinion.

The maximum value for the angular acceleration of the carrier, $\alpha_1 = -4.68\omega_2^2$ is again computed by the formula of FIGURE 7, the value for $C=32.5$, $a=11$ and $e=4.5$, and the maximum angular acceleration occurring when $\theta=65°$ approx.

The maximum value of the angular acceleration of the internal gear is $1.5 \times -4.68\omega_2^2 = 7.07\omega_2^2$.

Assuming that the member to be indexed is required to remain stationary during ½ cycle and is required to make one complete revolution during the second ½ cycle, then the internal gear must be geared in the ratio 2:3 with the member to be indexed and its maximum angular acceleration will be 2/3 of $7.02\omega_2^2$ or $4.68\omega_2^2$.

Five distinct species of the new and novel mechanism have now been fully described and many more combinations of gear ratios to produce various indexing or variable speed forward and reverse motions may be made and will become obvious to those skilled in the art, for example, an improvement on the 4-slot Geneva substitute illustrated in FIGURES 14, 15 and 16 has been made and this improvement is illustrated in FIGURES 21 to 24 inclusive, therefore, I do not limit this invention to the combinations illustrated and described.

For the above quoted values of angular velocities and angular accelerations of standard Geneva motions the following articles may be referred to: "Mathematical Analysis of the Geneva Movement," American Machinist, May 20, 1926, pages 793–798 incl., and "Mechanism for Intermittent Motion," Machine Design, Penton Publishing Co., Cleveland, Ohio.

I claim:
1. A mechanical movement which is designed to convert a constant input speed into a varying output speed, said mechanical movement comprising in combination:
   (a) a frame having spaced supports provided with suitable bearings,
   (b) a constant speed drive shaft journalled on some of said bearings and having one circular gear and one non-circular gear secured thereto, said non-circular gear comprising gear tooth segments arranged in rows,
   (c) a varying speed internal gear,
   (d) a second shaft journalled on others of said bearings and having two pinions secured to said shaft, one of said pinions driving said circular gear,
   (e) a planet pinion carrier mounted for free rotation on said second shaft and having planet pinions meshing with said internal gear and the other of said pinions of said second shaft,
   (f) a first pinion mounted concentrically relative to the axis of said second shaft and secured to said carrier,
   (g) a second and larger pinion eccentrically mounted relative to the axis of said second shaft, so that the pitch circles of said first and second pinion are tangent, said second pinion being secured to said carrier,
   (h) a third and still larger pinion eccentrically mounted relative to the axis of said second shaft, said eccentric mounting being diametrically opposite to that of said second pinion and so that their pitch circles are tangent, said third pinion also being secured to said carrier,
   (i) whereby said three pinions may mesh in sequence with their respective gear tooth segments of a row on said non-circular gear,

2. A mechanical movement which is designed to convert a constant input speed into a varying output speed, said mechanical movement comprising in combination:
   (a) a frame having spaced supports provided with suitable bearings,
   (b) a constant speed drive shaft journalled on some of said bearings and having one circular gear and one non-circular gear secured thereto, said non-circular gear comprising a concentric tooth segment and a plurality of eccentric tooth segments arranged in rows,
   (c) a varying speed internal gear,
   (d) a second shaft journalled on others of said bearings and having two pinions of different size secured to said shaft, the smaller of said pinions driving said circular gear,
   (e) a planet pinion carrier mounted for free rotation on said second shaft and having planet pinions meshing with said internal gear and the larger of said pinions of said second shaft,
   (f) a first pinion mounted concentrically relative to the axis of said second shaft and secured to said carrier,
   (g) a second and larger pinion eccentrically mounted relative to the axis of said second shaft, so that the pitch circles of said first and second pinion are tangent, said second pinion being also secured to said carrier,
   (h) a third and still larger pinion eccentrically mounted relative to the axis of said second shaft, said eccentric mounting being diametrically opposite to that of said second pinion and so that their pitch circles are tangent, said third pinion also being secured to said carrier,
   (i) whereby said carrier makes three revolutions when the respective gear tooth segments mesh in sequence with said three pinions for each revolution of said non-circular gear and thereby imparts a varying angular speed to said internal gear.

3. A mechanical movement which is designed to convert a constant input speed into a varying output speed, said mechanical movement comprising in combination:
(a) a frame having spaced supports provided with suitable bearings to receive shafts,
(b) a first constant speed drive shaft journalled on some of said bearings and having one circular and one non-circular gear secured thereto, said non-circular gear comprising gear tooth segments arranged in rows,
(c) a varying speed internal gear,
(d) a second constant speed drive shaft journalled on others of said bearings and having two pinions secured to said shaft, one of said pinions driving said circular gear,
(e) a planet pinion carrier freely rotatable on said second shaft having planet pinions thereon meshing with said internal gear and the other of said pinions of said second shaft,
(f) a group of one concentrically and two eccentrically mounted pinions secured to said carrier, said mounting providing a point of tangency between the pitch circles of adjacent pinions,
(g) whereby said pinions present a continuity of action when meshing with the gear tooth segments of said non-circular gear, and
(h) the sum of the numbers of teeth in said pinions being equal to the number of teeth in the segments of said non-circular gear.

4. A mechanical movement which is designed to reciprocate the type bed of a printing press at a constant speed during the printing operation, decelerate and accelerate and return said type bed at a varying speed, said mechanical movement comprising in combination:
(a) a frame having spaced supports provided with suitable bearings,
(b) a first constant speed drive shaft having one circular and one non-circular gear secured thereto and journalled in some of the bearings of said supports, said non-circular gear comprising gear tooth segments arranged in rows,
(c) a varying speed internal gear, said internal gear being provided with additional external gear teeth,
(d) a second shaft journalled on others of said bearings and having two pinions of different size secured to said shaft, the smaller of said pinions driving said circular gear,
(e) a planet pinion carrier freely rotatable on said second shaft and having planet pinions meshing with said internal gear and the larger of said pinions of said second shaft, and a group of one concentrically and two eccentrically mounted pinions secured to said carrier, said concentric pinion being smaller than the two eccentric pinions and the pitch circles of adjacent pinions being tangent, said pinions meshing respectively with gear tooth segments of said non-circular gear,
(f) and a type bed mounted on said supports for reciprocation thereon, a rack secured to the underside of said type bed and meshing with the external teeth of said internal gear.

5. A mechanical movement which is designed to reciprocate the type bed of a printing press at constant speed during the printing operation, decelerate, then accelerate and return said type bed at a varying speed, said mechanical movement comprising in combination:
(a) a frame having spaced supports provided with suitable bearings and bed tracks,
(b) a first constant speed drive shaft having one circular and one non-circular gear secured thereto and journalled in some of the bearings of said supports, said noncircular gear comprising gear tooth segments arranged in rows,
(c) a varying speed internal gear, said internal gear being provided with external gear teeth,
(d) a second shaft journalled on others of said bearings and having two pinions of different size secured to said shaft, the smaller of said pinions driving said circular gear,
(e) a planet pinion carrier having planet pinions meshing with said internal gear and the larger of said pinions of said second shaft, and a group of one concentrically and two eccentrically mounted pinions secured to said carrier, said concentric pinion being smaller than the two eccentric pinions and the pitch circles of adjacent pinions being tangent, said pinions meshing respectively with the gear tooth segments of said non-circular gear, and
(f) a type bed slidably mounted on said supports for reciprocation thereon, a rack secured to the underside of said type bed and meshing with the external teeth of said internal gear,
(g) whereby said combination of gearing results in zero acceleration and zero deceleration of said type bed at the beginning and termination of its reciprocation.

6. A mechanical movement which is designed to oscillate the swing-feed mechanism of a sheet feeder, said mechanical movement comprising in combination:
(a) a frame having spaced supports provided with suitable bearings,
(b) a first constant speed drive shaft having one circular and one non-circular gear secured thereto and journalled in some of said bearings, said noncircular gear comprising gear tooth segments arranged in rows,
(c) a varying speed internal gear connected to the swing-fed mechanism,
(d) a second constant speed shaft parallel to said first constant speed drive shaft and journalled on others of said bearings and having two pinions of different size secured to said shaft, the smaller of said pinions driving said circular gear,
(e) a 3-revolution planet pinion carrier freely rotatable on said second drive shaft and having planet pinions meshing with said internal gear and the larger of said pinions of said second constant speed shaft, and a first group of concentric pinions comprising two semi-pinions of different size, and a second group of eccentric pinions comprising two semi-pinions of equal size and one complete pinion, said concentrically and eccentrically mounted pinions meshing in sequence with respective gear tooth segments aligned therewith on said non-circular gear,
(f) whereby said combination of gearing oscillates said internal gear with its connected swing-fed mechanism at constant speed for sheet transfer, to be followed by deceleration to a period of rest and then thereafter by a variable speed return, again to be followed by an acceleration period to the constant speed condition.

7. A mechanical movement which is so designed whereby a constant angular speed driving member imparts a varying angular movement and a period of rest to a driven member, said mechanical movement comprising in combination:
(a) a frame having spaced supports provided with suitable bearings,
(b) a first constant speed drive shaft having one circular and one non-circular gear secured thereto and journalled in some of said bearings, said noncircular gear comprising gear tooth segments arranged in rows,
(c) a varying speed driven member having an internal gear connected thereto,
(d) a second constant speed drive shaft parallel to said first constant speed drive shaft and journalled on others of said bearings and having two pinions secured to said shaft, one of said pinions driving said circular gear,
(e) a 3-revolution planet pinion carrier freely rotatable on said second drive shaft and having planet pinions meshing with said internal gear and the other of said pinions of said second drive shaft, and one concentric and one eccentric pinion mounted on said carrier, said pinions meshing in sequence with respective gear tooth segments of said non-circular gear, (f) whereby said combination of gearing holds said driven member at rest during three-fourth of a cycle and then turns said driven member 180 degrees at variable angular velocity during the remaining one-fourth cycle.

8. A mechanical movement which is so designed wherewith a constant angular speed driving member imparts a varying angular movement and a period of rest to a driven member, said mechanical movement comprising in combination:

(a) a frame having spaced supports provided with suitable bearings, (b) a first constant speed drive shaft having one circular and one non-circular gear secured thereto and journaled in some of said bearings, said noncircular gear comprising gear tooth segments arranged in rows, (c) varying speed driven member having an internal gear connected thereto, (d) a second constant speed drive shaft parallel to said first constant speed drive shaft and journalled on others of said bearings and having two pinions of different size secured to said shaft, the smaller one of said pinions driving said circular gear, (e) a 3-revolution planet pinion carrier freely rotatable on said second drive shaft and having planet pinions meshing with said internal gear and the larger one of said pinions of said second drive shaft, and one concentrically and one eccentrically mounted pinion on said carrier, said pinions meshing in sequence respectively with a circular and a non-circular gear tooth segment of said non-circular gear respectively, (f) whereby said combination of gearing accelerates and decelerates said driven member smoothly and rotates said member through a considerable angle during one-fourth of the cycle and holds said driven member at rest during the remainder of the cycle.

9. A mechanical movement which is so designed wherein a constant angular speed driving member imparts a varying angular movement and a period of rest to a driven member, said mechanical movement comprising in combination:

(a) a frame having spaced supports provided with suitable bearings, (b) a first constant speed drive shaft having one circular and one non-circular gear secured thereto and journalled in some of said bearings, said noncircular gear comprising circular and noncircular gear tooth segments arranged in three rows, (c) a varying speed driven member having an internal gear connected thereto, (d) a second constant speed shaft parallel to said first constant speed shaft and journaled in others of said bearings on said supports and having two pinions secured to said shaft, one of said pinions driving said circular gear, (e) a 3-revolution planet pinion carrier freely rotatable on said second constant speed drive shaft and having planet pinions meshing with said internal gear and the other of said pinions of said second drive shaft, and two concentric pinions of different size and one eccentric pinion mounted on said carrier, so that the pitch circles of adjacent pinions are tangent, said pinions meshing in sequence wih respective gear tooth segments of said non-circular gear, (f) whereby said combination of gearing holds said driven member at rest during one-fourth of a cycle and then turns said driven member more than one revolution at a varying angular velocity for each revolution of said driving member during the remainder of the cycle.

10. A mechanical movement which is so designed wherein a constant speed driving member imparts a varying angular movement and a period of rest to a driven member, said mechanical movement comprising in combination:

(a) a frame having spaced supports with suitable bearings, (b) a first constant speed drive shaft having one circular and one non-circular gear secured thereto and journalled in some of said bearings, said non-circular gear comprising circular and noncircular gear tooth segments arranged in three rows, (c) a varying speed driven member having an internal gear connected thereto, (d) a second constant speed shaft parallel to said first constant speed shaft and journalled in others of said bearings on said supports and having two pinions of different size secured to said shaft, the smaller of said pinions driving said circular gear, (e) a planet pinion carrier making three revolutions per cycle and freely rotatable on said second shaft and having pinions meshing with said internal gear and the larger of said pinions of said second drive shaft, and two concentric pinions of different size and one eccentric pinion mounted on said carrier, said concentric pinions meshing with said circular gear tooth segments and said eccentric pinions meshing with said noncircular gear tooth segments of said non-circular gear, (f) whereby said combination of gearing holds said driven member at rest during one-fourth of a cycle and then turns said driven member more than 360 degrees at a varying angular velocity for one revolution of said driving member during the remainder of the cycle.

11. A mechanical movement which is so designed wherein a constant angular speed driving member imparts a varying angular movement and a period of rest to a driven member said mechanical movement comprising in combination:

(a) a frame having spaced supports provided with suitable bearings, (b) a first constant speed drive shaft making one revolution per cycle and having one circular and one non-circular gear secured thereto and journalled in some of said bearings, said non-circular gear comprising a plurality of gear tooth segments arranged in rows, (c) a varying speed driven member having an internal gear connected thereto, (d) a second constant speed drive shaft parallel to said first shaft and making more than five revolutions per cycle and journalled in others of said bearings on said supports and having two pinions of different size secured to said second shaft, the smaller of said pinions meshing with and driving said circular gear, (e) a planet pinion carrier making three revolutions per cycle and having planet pinions meshing with said internal gear and the larger of said pinions of said second constant speed shaft, and a plurality of concentrically and eccentrically mounted pinions secured to said carrier, said mounting being relative to the axis of rotation of said carrier, said pinions aligning and meshing in sequence with their respective gear tooth segments of said non-circular gear, (f) whereby said combination of gearing produces an acceleration and deceleration value of zero on said driven member when it begins to rotate or comes to rest respectively.

12. A mechanical movement which is so designed while a driving member rotates at constant speed a driven member remains at rest during the first half of a cycle and then accelerates to a peak speed and then again decelerates and comes to rest during the second half of a cycle, said mechanical movement comprising in combination:
(a) a frame having spaced supports provided with suitable bearings,
(b) a first constant speed drive shaft having one circular and one non-circular gear secured thereto and journalled in some of said bearings, said noncircular gear comprising a 180 degree circular tooth sector and a 180 degree non-circular tooth sector arranged tandem and staggered,
(c) a varying speed driven member having an internal gear connected thereto,
(d) a second constant speed shaft journalled in others of said bearings on said supports and having two pinions secured to said shaft, one of said pinions meshing with and driving said circular gear,
(e) a planet pinion carrier having planet pinions meshing with said internal gear and the other of said pinions of said second shaft and one concentrically and one eccentrically mounted pinion secured to said carrier, so that the pitch circles of said pinions have a point of tangency and align and mesh with respectively said 180 degree concentric sector and said 180 degree noncircular sector of said non-circular gear,
(f) whereby said combination of gearing rotates said driven member 540 degrees in the opposite sense from that of the driving member.

13. A mechanical movement which is so designed wherein a driving member rotates at constant speed while a driven member remains at rest during the first half of a cycle and then accelerates to a peak speed and then decelerates and comes to rest during the second half of a cycle, said mechanical movement comprising in combination:
(a) a frame having spaced supports provided with suitable bearings,
(b) a first constant speed drive shaft having one circular and one non-circular gear secured thereto and journalled in some of said bearings, said noncircular gear comprising a 180 degree circular tooth sector and a 180 degree noncircular tooth sector arranged side by side and tandem,
(c) a varying speed driven member having an internal gear connected thereto,
(d) a second constant speed shaft parallel to said first shaft and journalled in others of said bearings on said supports and having two pinions of different size secured to said shaft, the larger of said pinions meshing with and driving said circular gear,
(e) a planet pinion carrier making three revolutions per cycle and freely rotatable on said second shaft and having planet pinions meshing with said internal gear and the smaller of said pinions of said second shaft and one concentrically and one eccentrically mounted pinion secured to said carrier, so that the pitch circles of said pinions have a point of tangency and align and mesh with respectively said 180 degree circular sector and said 180 degree noncircular sector of said non-circular gear,
(f) whereby said combination of gearing produces an acceleration and deceleration value of zero at the beginning and termination of the movement of said driven member.

14. A mechanical movement wherein dual, constant speed input gear members, making one revolution per cycle, impart to an output member a varying angular cyclic motion and periods of rest, said movement comprising in combination,
(a) a 3-revolution member having two or more concentrically and eccentrically mounted pinions, said pinions mating with one of said dual input gear members and having a connection to the pinion carrying element of
(b) a 3-element differential gear set whose second element thereof serves as said output member, and
(c) the third element of said differential gear set having a gear connection with the other of said dual input gear members,
(d) whereby said combination of gearing provides said output member with a zero value of acceleration and deceleration at the beginning and termination of the cyclic movement.

15. A mechanical movement wherein dual, constant speed input members, making one revolution per cycle, impart to an output member an angular cyclic motion of varying degree and direction and intermittent periods of rest, said movement comprising in combination:
(a) a frame having spaced supports with suitable bearings for
(b) a first constant speed drive shaft on which said dual, constant speed gear members are secured, said gear members comprising one circular and one non-circular gear, said noncircular gear comprising a plurality of gear tooth segments arranged in rows, and
(c) a second constant speed drive shaft parallel to said first constant drive shaft and making a greater number of revolutions per cycle than said first drive shaft, and having a pinion secured thereto and meshing with said circular gear on said first drive shaft, and
(d) a 3-element planetary gear set comprising an internal gear, which serves as the output member of the mechanical movement, a sun gear and a carrier, said carrier having planet pinions rotatably mounted on studs secured to said carrier which is freely rotatable on said second drive shaft, said planet pinions meshing with said internal gear and said sun gear, said sun gear being secured to said second constant speed drive shaft, and
(e) a plurality of pinions secured to said carrier, at least one of said pinions being mounted eccentrically so that its pitch circle is tangent to the pitch circle of an adjacent pinion to provide a continuous engagement of said pinions with their respective gear tooth segments on said noncircular gear on said first constant speed drive shaft,
(f) said carrier thereby making three revolutions when said constant speed drive shaft makes one revolution, and
(g) whereby the cyclic motion of said output member is characterized by a zero value of acceleration and deceleration at the beginning and termination of said cyclic motion.

References Cited by the Examiner
UNITED STATES PATENTS

| | | | |
|---|---|---|---|
| 1,574,383 | 2/26 | Fraser | 74—681 |
| 1,953,151 | 4/34 | Cahill | 74—681 |
| 2,128,413 | 8/38 | Hejduk et al. | 74—681 |
| 2,143,236 | 1/39 | Birk | 74—435 |
| 2,152,288 | 3/39 | Seybold | 74—394 |
| 2,509,685 | 5/50 | Hughes | 74—689 |
| 2,618,440 | 11/52 | Scott et al. | 74—681 |
| 2,730,363 | 1/56 | Dietrich et al. | 74—394 |
| 2,972,905 | 2/61 | Bullard | 74—681 |

DON A. WAITE, *Primary Examiner*.
BROUGHTON G. DURHAM, *Examiner*.